(12) United States Patent
Fraser et al.

(10) Patent No.: US 11,403,395 B1
(45) Date of Patent: Aug. 2, 2022

(54) METHOD OF USING A DYNAMIC RULE ENGINE WITH AN APPLICATION

(71) Applicant: Wizard Tower TechnoServices Ltd., Vancouver (CA)

(72) Inventors: Daniel Braydon Norman Fraser, Surrey (CA); Michael George Peddemors, Vancouver (CA)

(73) Assignee: WIZARD TOWER TECHOSERVICES LTD., Vancouver (CA)

(*) Notice: Subject to any disclaimer, the term of this patent is extended or adjusted under 35 U.S.C. 154(b) by 32 days.

(21) Appl. No.: 16/831,415

(22) Filed: Mar. 26, 2020

Related U.S. Application Data (60) Provisional application No. 62/824,194, filed on Mar. 26, 2019.

(51) Int. Cl.
*G06F 21/55* (2013.01)
*G06F 21/57* (2013.01)

(52) U.S. Cl.
CPC .......... *G06F 21/554* (2013.01); *G06F 21/577* (2013.01); *G06F 2221/033* (2013.01)

(58) Field of Classification Search
CPC . G06F 21/554; G06F 21/577; G06F 2221/033
See application file for complete search history.

(56) References Cited

U.S. PATENT DOCUMENTS

| | | | | |
|---|---|---|---|---|
| 8,826,308 | B1* | 9/2014 | Jolfaei | G06F 9/542 719/328 |
| 2006/0092861 | A1* | 5/2006 | Corday | H04L 41/0246 370/256 |
| 2010/0218169 | A1* | 8/2010 | Andersen | G06F 11/3668 717/125 |
| 2015/0022339 | A1* | 1/2015 | Matsuoka | G08B 19/00 340/506 |
| 2016/0149945 | A1* | 5/2016 | Tijerina | G06F 9/30094 726/25 |
| 2016/0380915 | A1* | 12/2016 | Umapathy | G06F 9/451 709/226 |
| 2019/0379677 | A1* | 12/2019 | Zenz | H04L 63/0227 |

* cited by examiner

*Primary Examiner* — Meng Li
(74) *Attorney, Agent, or Firm* — Klarquist Sparkman, LLP (57) ABSTRACT

A method of using a Dynamic Rule Engine (DRE) with an application. At runtime of the application, the application determines that a trigger point has been reached. The DRE identifies one or more rules associated with the trigger point. Each of the one or more rules defines one or more conditions, and each condition is associated with one or more properties. For each of the one or more rules, the DRE evaluates the one or more conditions defined in the rule. Evaluating a condition includes determining a current value of each of the one or more properties associated with the condition, and comparing the one or more current values to one or more predetermined values. Based on the comparison, the DRE determines whether one or more actions are to be performed. If the one or more actions are determined to be performed, the application performs the one or more actions.

20 Claims, 3 Drawing Sheets

METHOD OF USING A DYNAMIC RULE ENGINE WITH AN APPLICATION

CROSS-REFERENCE TO RELATED APPLICATION

This application claims the benefit of U.S. provisional patent application No. 62/824,194 filed on Mar. 26, 2019, entitled "Method of Using a Dynamic Rule Engine with an Application", the entirety of which is hereby incorporated by reference herein.

FIELD OF THE DISCLOSURE

The present disclosure relates to a method of using a Dynamic Rule Engine with an application, and to a Dynamic Rule Engine that may be used with an application.

BACKGROUND TO THE DISCLOSURE

It is commonplace in software system administration to manage situations or events of interest which occur in the software system or service by carrying out specific actions in response to detecting such situations or events. For example, such situations may include a service outage due to malfunctioning software components which may require a system restart, or network services being attacked by malicious actors which may require security or firewall rule updates.

If an event of interest and the steps taken in response to the event never change, then native software source code updates can be deployed to specifically detect the event of interest and perform the specific actions to deal with the event.

However, native software source code updates become inconvenient, burdensome or outright impossible to re-deploy when the operational conditions of an event of interest, or the steps taken to handle such an event, are variable, with little or no reliable means of predicting how the conditions will change or what actions might be required to deal with the changing conditions.

For example, in the context of network services such as SMTP or IMAP (e-mail), it is common for remote actors to misbehave for a variety of reasons. Some examples of misbehaving include unintentionally using protocol standards incorrectly (misconfigured e-mail servers) or abusing vulnerable protocol semantics (brute forcing passwords). In each occurrence, the exact behaviour exhibited may be intentional or unintentional, and the exact conditions which must be detected to confirm the remote actor is misbehaving may change.

As another example, many forms of software that handle the acceptance of network connections and network communications are designed to record and handle information gathered during these processes, for example the connecting IP address, port, geo-location, type of client, and information passed on initialization or negotiation. Traditionally, however, decisions based on this information depend on hard-coded evaluation rules written into the native code of the software.

It would therefore be advantageous to deal with the variability of the occurrences of such events, and the variability of the actions that may be required to deal with such events, without having to resort to native source code updates.

SUMMARY OF THE DISCLOSURE

In accordance with a first aspect of the disclosure, there is provided a method of using a Dynamic Rule Engine (DRE) with an application, wherein the method comprises, at runtime of the application: determining with the application that a trigger point has been reached; identifying with the DRE one or more rules associated with the trigger point, wherein each of the one or more rules defines one or more conditions, and wherein each condition is associated with one or more properties; for each of the one or more rules, evaluating with the DRE the one or more conditions defined in the rule, wherein evaluating a condition comprises: determining a current value of each of the one or more properties associated with the condition; and comparing the one or more current values to one or more predetermined values; determining with the DRE, based on the comparison, whether one or more actions are to be performed; and if the one or more actions are determined to be performed, performing with the application the one or more actions.

The method may further comprise, in response to determining that the trigger point has been reached, sending from the application to the DRE a trigger point identifier associated with the trigger point. Identifying with the DRE the one or more rules associated with the trigger point may comprise the DRE using the trigger point identifier to identify the one or more rules associated with the trigger point.

The method may further comprise the application providing the DRE with a current value of each property in a list of predefined properties.

The method may further comprise, prior to runtime of the application, defining in source code of the application: one or more trigger points forming a trigger list; one or more properties forming a property list; and one or more actions forming an action list.

The method may further comprise, prior to runtime of the application, one or more of: defining in the source code, and adding to the trigger list, at least one further trigger point; defining in the source code, and adding to the property list, at least one further property; and defining in the source code, and adding to the action list, at least one further action.

The method may further comprise, at runtime of the application, defining in the DRE a new rule associated with at least one trigger point selected from the trigger list, wherein the at least one new rule defines: one or more conditions, wherein each condition is associated with one or more properties selected from the property list; and one or more actions to be performed, selected from the action list.

The method may further comprise, at runtime of the application, modifying at least one of the rules defined in the DRE by performing one or more of: modifying at least one of the trigger points associated with the at least one of the rules; modifying at least one of the conditions defined in the at least one of the rules; and modifying at least one of the actions defined in the at least one of the rules.

Each of the one or more actions to be performed may be associated with an action identifier, and the method may further comprise: if the one or more actions are determined to be performed, sending from the DRE to the application one or more action identifiers associated with the one or more actions to be performed; and using with the application the one or more action identifiers to identify, from an action list comprising one or more predefined actions each associated with an action identifier, the one or more actions to be performed.

A property may comprise a token defined in source code of the application.

Determining that the trigger point has been reached may comprise determining that a portion of source code associated with the trigger point is being executed.

Determining that the trigger point has been reached may comprise determining that the application has entered a particular operational state.

Performing the one or more actions may comprise modifying operation of the application.

In a further aspect of the disclosure, there is provided a method of using an application, wherein the method comprises, prior to runtime of the application: defining in source code of the application: one or more trigger points forming a trigger list; one or more properties forming a property list; and one or more actions forming an action list, at runtime of the application, determining with the application that a trigger point comprised in the trigger list has been reached; in response to determining that the trigger point has been reached, sending a trigger point identifier from the application to a Dynamic Rule Engine (DRE), wherein the trigger point identifier identifies the trigger point that has been reached; enabling the DRE to determine a current value of each property comprised in the property list; receiving from the DRE one or more action identifiers; using the one or more action identifiers to identify within the action list one or more actions to be performed; and performing the one or more actions.

Enabling the DRE to determine the current value of each property comprised in the property list may comprise: determining a current value of each property in the property list; and sending the determined current value of each property to the DRE.

The method may further comprise, prior to runtime of the application, one or more of: adding at least one further trigger point to the trigger list by defining in the source code the at least one further trigger point; adding at least one further property to the property list by defining in the source code the at least one further property; and adding at least one further action to the action list by defining in the source code the at least one further action.

In a further aspect of the disclosure, there is provided a system comprising one or more processors configured to execute a Dynamic Rule Engine (DRE) module and an application. The one or more processors are further configured to perform any of the above-described methods.

In a further aspect of the disclosure, there is provided a computer-readable medium having stored thereon computer program code configured when executed by one or more processors to cause the one or more processors to perform any of the above-described methods.

BRIEF DESCRIPTION OF THE DRAWINGS

Embodiments of the disclosure will now be described in detail in conjunction with the accompanying drawings of which.

DETAILED DESCRIPTION

The present disclosure seeks to provide improved methods of using a Dynamic Rule Engine with an application. While various embodiments of the disclosure are described below, the disclosure is not limited to these embodiments, and variations of these embodiments may well fall within the scope of the disclosure which is to be limited only by the appended claims.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

Generally, according to embodiments of the disclosure, there is described Dynamic Rule Engine (DRE) that may provide a means of encoding conditions for detecting an arbitrary operational state of a software system or application, and then executing one or more predefined actions. The DRE may be a self-contained software module capable of integrating into an existing software system, thereby allowing for the opportunistic evaluation of, for example, pre-defined structured Boolean expressions (which may be referred to as dynamic rules). The dynamic rules may encode the patterns associated with operational states of interest in the target software application.

For example, the DRE may allow a client software which accepts network activity to implement the methodology described herein, in order to make decisions based on dynamic rules. Software implementing the DRE described herein may typically accept connections and data via a network connection, and the DRE may allow the client to standardize information the software gathers over the course of that interaction. The information may be standardized into a pre-determined structure such that information may be tested against a standard model of dynamic rules.

The DRE may be configured to evaluate dynamic rules at arbitrarily-defined locations or times in the target software application, and to trigger the execution of arbitrarily-defined actions in the target software application. The dynamic rules may be deployed in real-time without the need for native software updates.

A dynamic rule may comprise a data structure (which may be represented in languages such as JSON) that comprises two components. The first component may comprise a set of meta-information for the rule, and the second component may comprise a recursive structure of sub-nodes representing the Boolean expression which may encode the detection conditions for a pattern or signature of a specific operational state of the target software application.

Evaluation of the Boolean expression within a dynamic rule may be performed at runtime of the target software application by an evaluation engine (as described in further detail below) in order to establish whether the operational state of the target software application at the time of evaluation corresponds to the pattern encoded in the dynamic rule.

The meta-information within a dynamic rule may be used to control external aspects of the rule pattern evaluation, such as the location in the source code or the time at which the rule is evaluated, or the steps or actions that may be taken if the pattern encoded in the rule matches the operational state of the target software application.

Detection of specific operational states of the target software application may allow the operator to determine if the software application is properly handling a specific situation which may be of interest, and to optionally perform one or more predefined actions in the software application if the dynamic rule pattern encoded in the rule is matched.

The detection of specific states in the target software application is not exclusive to dynamic rules. For example, a software source code modification to the target application may be performed to produce logic equivalent to any dynamic rule. However, as discussed above, native source code modifications require re-deployment of the software application in order for the modified source code to be implemented. On the other hand, dynamic rules according to the embodiments described herein do not require any such re-deployment of the target software application. Instead, the deployment dynamic rules may be carried out at runtime, without interrupting the target software application.

Figure 1:
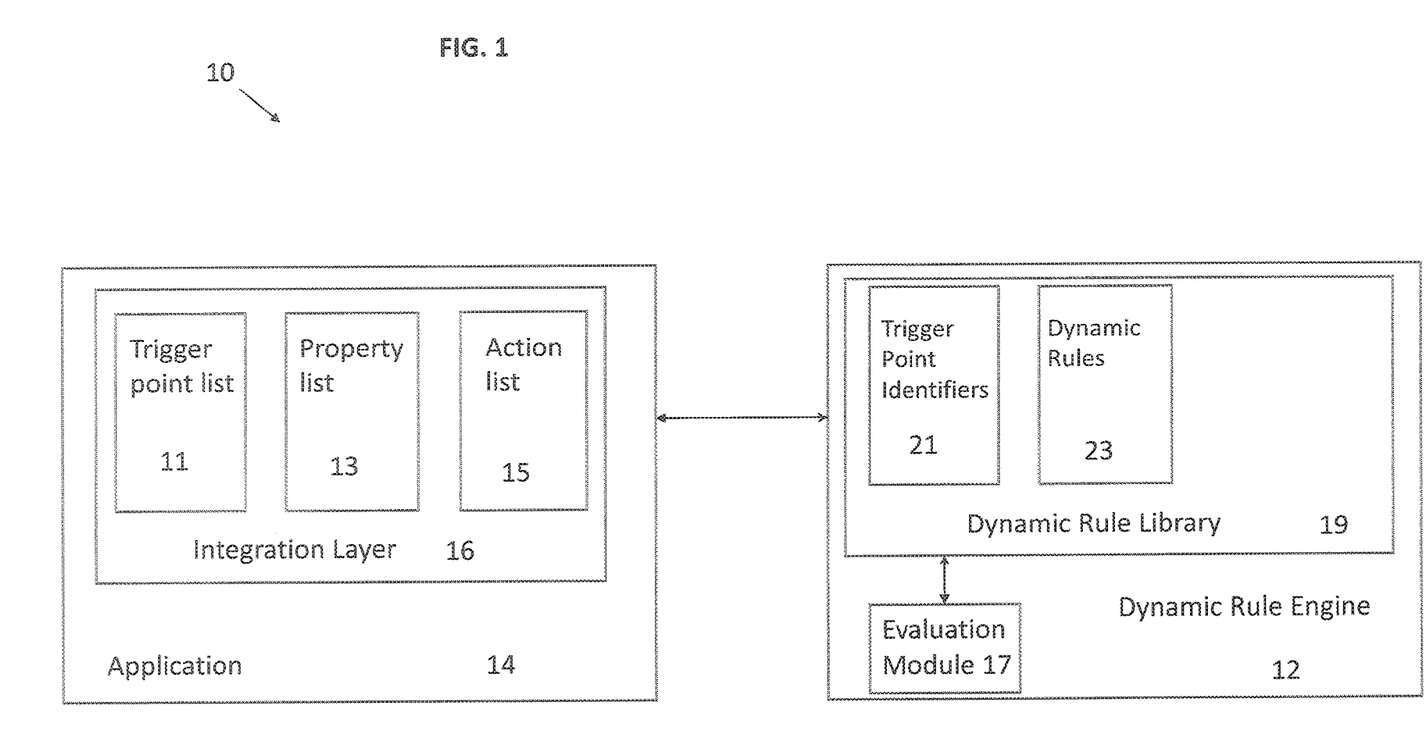
FIG. 1 is a schematic diagram of a system comprising a Dynamic Rule Engine deployed with an application, according to embodiments of the disclosure.

Turning to FIG. 1, there is shown a system 10 according to embodiments of the disclosure. System 10 comprises a Dynamic Rule Engine (DRE) 12 operable to interact with a target application 14. Application 14 may be, for example, an application that provides data availability to a connecting client (such as an e-mail server, a web service, SAAS), an application that handles incoming requests for a web service, a network access control layer software, or intrusion detection software. However, the disclosure is not limited to these specific types of applications, but extends to any suitable application that may be used in combination with the DRE described herein.

DRE 12 comprises a dynamic rule library 19 comprising a set of one or more user-defined dynamic rules 23. Each dynamic rule 23 is associated with one or more trigger point identifiers comprised in a set of trigger point identifiers 21. DRE 12 further includes an evaluation module 17 for evaluating dynamic rules 23. Dynamic rule library 19 may include individual dynamic rules 23 as binary files, or alternatively dynamic rule library 19 may include a single file with multiple dynamic rules 23 distributed in formats such as JSON either for conversion to binary files or in a native format that may be implemented by dynamic rule library 19 without the need for conversion.

Prior to execution of application 14, an integration layer 16 is applied to the native source code of application 14. Integration layer 16 comprises a trigger point list 11 comprising one or more trigger points, a property list 13 comprising one or more properties, and an action list 15 comprising one or more actions. Trigger points, properties, and actions defined within each of lists 11, 13, and 15 are defined by the user prior to runtime of application 14. In the context of this disclosure, a "list" may include a single item.

Each trigger point comprised within trigger point list 11 comprises an identification of one or more locations within the native source code of application 14, and/or comprises an identification of one or more specific points in time during operation of application 14. For example, a trigger point may comprise "on connection", "on authentication", "first data received", or "connection_handler". Thus, the user of application 14 may configure trigger point list 11 to include trigger points that identify points in time at which a dynamic rule 23 (whether current or future) should be evaluated, as will be described in further detail below.

Each property within property list 13 identifies one or more tokenized data items (e.g. operational variables) comprised within the native source code of application 14. A data item may be any suitable form of information held within application 14. Thus, by configuring property list 13 to include properties that identify data items of interest, a user of application 14 may capture any data item within application 14 that potentially could be used for any current and future dynamic rule 23, as will be described in further detail below.

Each action within action list 15 identifies one or more actions that are to be performed by application 14. The actions defined in action list 15 include a name and an action handler responsible for performing the operation(s) defined by the action. For example, an action may include "hardblock" (reject), "softblock" (reject temporarily), or "flag" (for internal handling). Thus, the user of application 14 may configure action list 15 to include a range of possible actions that may be performed in response to determining that one or more conditions defined in dynamic rules 23 have been met, as described in further detail below.

As mentioned above, each dynamic rule 23 is associated with one or more trigger point identifiers in a set of trigger point identifiers 21. Each trigger point identifier is associated with one or more trigger points selected from trigger point list 11. Furthermore, each dynamic rule 23 defined within dynamic rule library 19 comprises one or more conditions, with each condition being associated with one or more properties selected from property list 13. Depending on the outcome of the evaluation of a condition, one or more action identifiers are returned. Each action identifier is associated with one or more actions selected from action list 15.

For example, a dynamic rule 23 may be defined in terms of the trigger point "After the client disconnects", the condition "Has the software system been running longer than 1 day?", and the action "Restart the software system". At runtime of application 14, application 14 may determine that the trigger point has been reached by determining that the client disconnected. In response to application 14 determining that the client has disconnected, evaluation module 17 checks the condition "Has the software system been running longer than 1 day?" by retrieving or otherwise obtaining the current values for the properties associated with this condition; in this example, the property may be "Duration software system has been running". If evaluation module 17 determines that application 14 has been running for longer than 1 day, then evaluation module 17 may return an action identifier that identifies the action "Restart the software system". This action is then performed by application 14.

The ability to opportunistically load and evaluate dynamic rules at runtime of application 14 allows for the deployment of new dynamic rules 23 without interruption of application 14. However, updates to integration layer 16 within application 14 may still be necessary if the operator wishes to extend the set of trigger points, properties, and/or actions linked to dynamic rules 23. The more exhaustively trigger point list 11, property list 13, and action list 15 are defined, the more flexibility a user will have to define new dynamic rules 23 at runtime of application 14.

Figure 2:
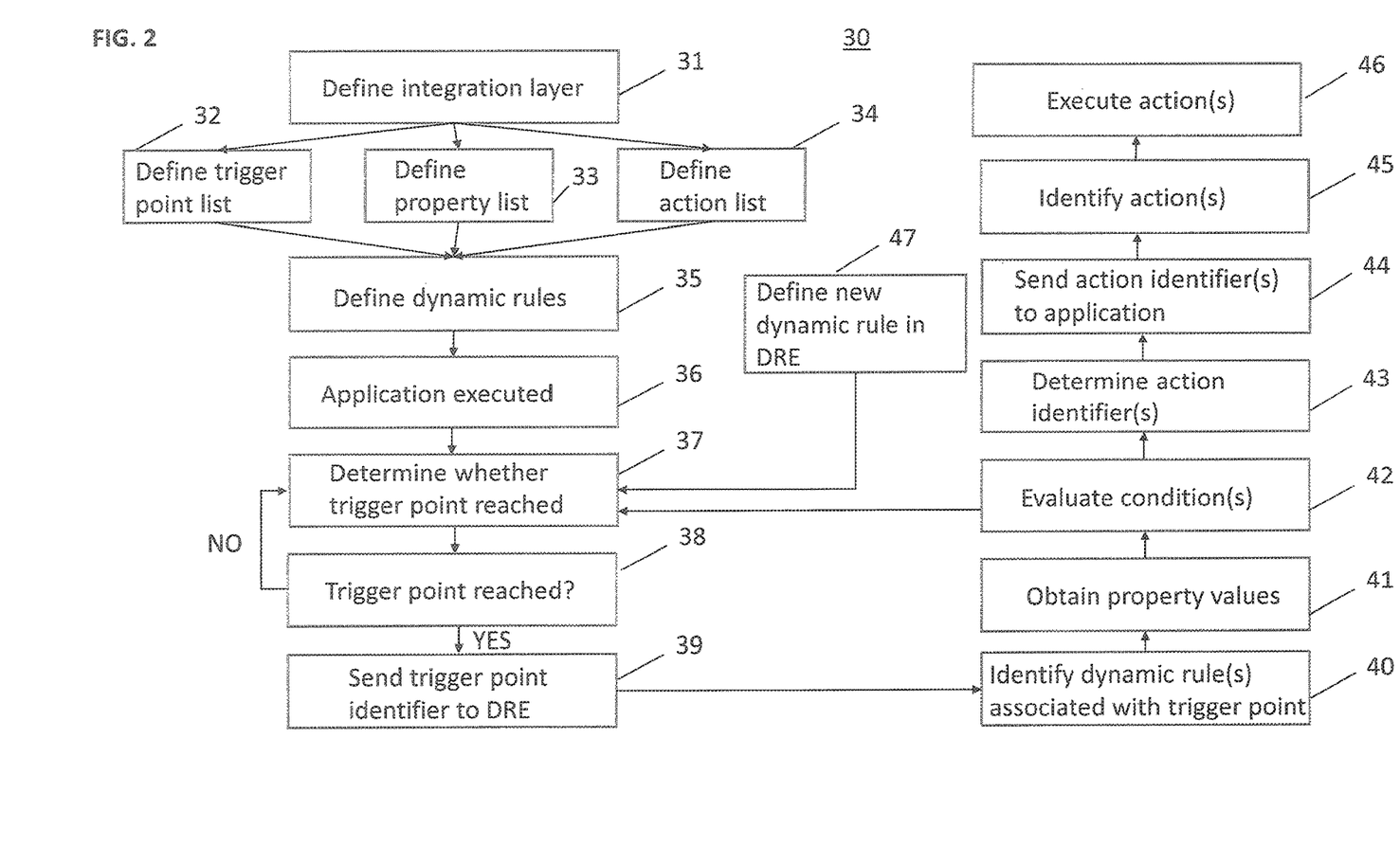
FIG. 2 is a flow diagram of a method of using a Dynamic Rule Engine with an application, according to embodiments of the disclosure.

Turning to FIG. 2, there is shown a method 30 of using DRE 12 with application 14, according to embodiments of the disclosure. As would be recognized by the skilled person, operations shown therein may, within the bounds of the disclosure, be performed in a different order, or may be omitted.

At block 31, the user defines integration layer 16. Integration layer 16 is defined in source code of application 14 by defining one or more trigger points and thereby forming trigger point list 11 (block 32), defining one or more properties and thereby property list 13 (block 33), and defining one or more actions and thereby action list 15 (block 34).

At block 35, the user defines one or more dynamic rules 23 within dynamic rule library 19 of DRE 12. As described above, each dynamic rule 23 is associated with one or more trigger point identifiers 21. Each trigger point identifier 21 is associated with one or more trigger points selected from trigger point list 11. Furthermore, each dynamic rule 23 comprises one or more conditions, with each condition being associated with one or more properties selected from property list 13. Still further, each dynamic rule 23 is configured, depending on the outcome of the evaluation of its conditions, to output one or more action identifiers. Each action identifier is associated with one or more actions selected from action list 15.

At block 36, application 14 is executed. At blocks 37 and 38, application 14 determines whether any of the trigger points defined within trigger point list 11 has been reached. A trigger point is determined to have been reached when, for example, a pre-determined portion of native source code, associated with the trigger point, is executed by application 14 in the course of the operation of application 14. If application 14 determines that a trigger point has been reached, then, at block 39, application 14 sends to DRE 12 a trigger point identifier that identifies the specific trigger point that has been reached. If application 14 determines that no trigger point has been reached, then the process returns to block 37 until a trigger point is determined to have been reached.

At block 40, evaluation module 17 of DRE 12 identifies within dynamic rule library 19 one or more dynamic rules 23 associated with the received trigger point identifier. At block 41, for each dynamic rule 23 associated with the trigger point identifier, DRE 12 obtains the current value of each property comprised in the condition or conditions associated with the dynamic rule 23. DRE 12 may obtain the current values of the properties using various means. For example, application 14 may provide DRE 12 with the current value of each property defined within property list 13. Alternatively, if the current value of each property is not recorded by application 14, a callback may be used whose purpose is to gather the required information on the fly, and return the information as if it were already stored. For instance, while application 14 may store the value of each property, instead a callback may be used to retrieve the equivalent data via alternative means. For example, the callback may be used to return the value of a "virtual" token (e.g. the callback may obtain the value of one or more of the properties from a third-party system).

At block 42, evaluation module 17 evaluates each condition comprised within dynamic rule 23, using the obtained current values of the property or properties comprised within the condition. The current values of the property or properties are then compared to one or more predetermined values. At block 43, based on the result of the comparison, evaluation module 17 determines whether any action identifiers are returned in response to the evaluation of the condition or conditions. If one or more action identifiers are returned, at block 44, DRE 12 sends the one or more action identifiers to application 14. If no action identifiers are returned, the process returns to block 37.

At block 45, application 14 identifies the one or more actions, from within action list 15, that correspond to the one or more received action identifiers. At block 46, application 14 performs the one or more actions.

At runtime of application 14, at block 47, the user may define one or more additional dynamic rules 23 which are added to dynamic rule library 19 of DRE 12. Any new dynamic rule may be associated with any of the trigger points comprised in trigger point list 11. Furthermore, any condition of the newly-defined dynamic rule 23 may comprise any property defined within property list 13, and the newly-defined dynamic rule 23 may be associated with any of the actions defined within action list 15. Advantageously, new dynamic rules 23 may be added to DRE 12 on-the-fly, without the need for native source code updates to application 14.

In addition to defining new dynamic rules 23, existing dynamic rules 23 may be modified at runtime of application 14, by modifying the trigger point(s) associated with the dynamic rule, the conditions defined in the dynamic rule, the properties comprised in any of the conditions, and the action identifiers that are returned should the conditions be determined to have been met.

Example 1

A developer of a web service wishes to implement a DRE so that they may dynamically create security rules to prevent emerging attacks. They have created software which handles incoming requests. In order to better prevent emerging attacks, portions of the connection process are identified in the form of tokens. The tokens are used to form the basis of conditions comprised in dynamic rules that a dynamic rule engine then makes assessments on. For instance, at "CONNECTION", the IP Address can be determined, the PTR of the IP Address, the country of origin, the web client that is used, the operating system of the connecting system, as well as authentication credentials. Once a client connects to the web service, the developer has the ability to identify the resources requested by the client. This information is tokenized by the developer into tokens that are stored either as they are received or at specific points in the web service's processing of the connection.

Below are examples of tokens that the developer wishes to store in the integration layer:
REMOTE_IP
REMOTE_COUNTRY
REMOTE_PTR_DOMAIN
REMOTE_PTR_RAW
REMOTE_PTR_TLD
REMOTE_OS_FINGERPRINT_RAW
REMOTE_OS_FAMILY
REMOTE_CLIENT
. . .
AUTH_USERNAME
AUTH_PASSWORD
. . .
REQUEST_URL
REQUEST_STRING
REQUEST_PARAMS
. . .
LAST_CONNECTION_TIME
CONNECTION_ATTEMPTS
. . .

The developer also defines different trigger points that are made available to test certain dynamic rules. Examples of such trigger points include:
CONNECTION
REQUEST
PARSE_URL
END_CONNECTION Once the trigger points and tokens are defined in the integration layer, the developer can implement the integration layer in their application.

The developer may then discover a new, never-before-detected situation. Instead of rewriting the codebase to handle the situation, the developer decides to create a specific situation handler by defining a new dynamic rule.

For instance, the developer may notice a particular attack against their web service that has a very specific set of characteristics, e.g. the attacks seem to come from "ZOOKASTAN", with random host names but all using the same TLD, e.g. ".ZOO". All the attacks are attempting to guess the password for the user "ADMIN" using the system login URL. Since all of the administrators are located in the US, these are obvious attackers that the developer wishes to permanently block, before the password is guessed.

The logic that the developer wishes to apply is that any connection that has attempted the ADMIN login from ZOOKASTAN with the TLD of .ZOO should have their IP Address automatically blacklisted from connecting in the future, and any attempt to connect at all from ZOOKASTAN should receive a warning message (404).

In order to implement this functionality, the developer defines two dynamic rules in the DRE, each configured to be executed at different trigger points for different reasons.

Rule #1

The trigger point is defined as "PARSE_URL", and results in the rule being executed after processing the Authentication and after evaluating the URL (Request).

The actions the developer defines in the dynamic rule include a "hardblock", an action defined as putting the IP Address on the system blacklist via iptables. Furthermore, an additional action would include sending an e-mail to the developer every time this event occurs, as well as "alert_authorities" which reports the IP Address to other systems.

The actual logic is defined in a "condition_group" which contains a set of four defined conditions. The dynamic rule includes the modifier "and", meaning all four conditions have to be met in order for the actions to be performed:

Condition #1—REMOTE_COUNTRY is equal to ZOOKISTAN
Condition #2—REMOTE_TLD is equal to ZOO
Condition #3—REQUEST_URL contains /login.php
Condition #4—AUTH_USERNAME is equal to ADMIN Since the 3$^{rd}$ and 4$^{th}$ conditions aren't defined until the PARSE_URL trigger point, the whole rule is set to have a trigger point as PARSE_URL.

Rule #2

Because there could be an accidental case of someone attempting to access the login from ZOOKISTAN, or an accidental problem in determining the country of origin, the developer wishes to simply provide a "You are not allowed" message.

The trigger point is set as "CONNECTION", which occurs early on, reducing risks and preventing any authentication attacks, in case the attacker chooses to use a different TLD.

The actions include "softblock", an action defined as rejecting the connection with a 404 error message, for example "You are not allowed to access this server from %ip_address %". Further actions include "log" which would log such an attempt for further investigation.

The logic is defined in a condition_group which contains a set of two defined conditions. The dynamic rule includes the modifier "or", meaning that if either condition is met then the actions are executed.

Condition #1—REMOTE_COUNTRY is equal to ZOOKISTAN
Condition #2—REMOTE_TLD is equal to ZOO Since all of these tokens are defined at CONNECTION, the trigger point is set as CONNECTION.

Example 2

After running the two dynamic rules for a week, in reviewing the logs that Rule #2 produced, the developer is able to see that the same actor moved to "NEXASTAN" as well. This results in a small change to the above rules. Instead of using Condition #1 in each of the rules, the developer modifies the rule to use a condition_group to replace Condition #1 with two conditions and the modifier "or".

Condition #1 is replaced with a child condition group. The child condition group contains two conditions:

Condition #1—REMOTE COUNTRY is equal to ZOOKISTAN
Condition #2—REMOTE COUNTRY is equal to NEXASTAN All three rules as written in a standardized DRE format (JSON):

```
{
  "example_rule1": {
    "hook": "parse_url",
    "action": "softblock",
    "status": "active",
    "version": 1,
    "flags": "blacklist,report",
    "argument": "Illegal/Malicious Access Detected",
    "main": {
      "mod": "and",
      "country_zookistan": {
        "property": "remote_country",
        "comparison": "equal",
        "value": "zookistan",
      },
      "tld_zookistan": {
        "property": "remote_ptr_tld",
        "comparison": "equal",
        "value": "zoo"
      },
      "attempted_login": {
        "property": "request_url",
        "comparison": "contains",
        "value": "login.php"
      },
      "auth_username": {
        "property": "auth_username",
        "comparison": "equal",
        "value": "ADMIN"
      }
    }
  }
}
{
  "example_rule2A": {
    "hook": "connection",
    "action": "softblock",
    "status": "active",
    "version": 1,
    "flags": "log",
    "argument": "Sorry, your %ip_address% is not permitted to access",
    "main": {
```

```
            "mod": "and",
            "country_zookistan": {
                "property": "remote_country",
                "comparison": "equal",
                "value": "zookistan",
            },
            "tld_zookistan": {
                "property": "remote_ptr_tld",
                "comparison": "equal",
                "value": "zoo"
            }
        }
    }
}
{
    "example_rule2B": {
        "hook": "connection",
        "action": "softblock",
        "status": "active",
        "version": 1,
        "flags": "log",
        "argument": "Sorry, your %ip_address% is not permitted to access",
        "main": {
            "mod": "and",
            "bad_countries": {
                "mod": "and",
                "country_zookistan": {
                    "property": "remote_country",
                    "comparison": "equal",
                    "value": "zookistan",
                },
                "country_nezastan": {
                    "property": "remote_country",
                    "comparison": "equal",
                    "value": "nezastan",
                }
            },
            "tld_zookistan": {
                "property": "remote_ptr_tld",
                "comparison": "equal",
                "value": "zoo"
            }
        }
    }
}
```

Example 3

In this case, the target application handles inbound support requests. The developer decides that they would like the advantages of a DRE to monitor usage patterns, and to detect any new and emerging threats. They decide to tokenize all information regarding the connection, and define such tokens in the integration layer. The trigger list includes trigger points at the connection level, after the data has been received. The developer first wishes to log information based on a subset of the tokens, without any clear idea of what kind of threats they will encounter. Thus, the action is defined as "log" which for every connection simply logs the tokens in the integration layer.

```
{
    "log_connection": {
        "hook": "post_submit",
        "action": "flag",
        "status": "active",
        "version": 1,
        "flags": "log",
        "argument": "Logging DRE Tokens",
        "main": {
            "mod": "and",
            "not_my_office": {
                "mod": "and",
                "office_ip": {
                    "property": "remote_ip",
                    "comparison": "not_equal",
                    "value": "192.168.1.8",
                },
                "office2_ip": {
                    "property": "remote_ip",
                    "comparison": "not_equal",
                    "value": "192.168.2.9",
                }
            },
            "submit_email_field": {
                "property": "form_field_email",
                "comparison": "not_equal",
                "value": "support@mycompany.com"
            }
        }
    }
}
```

Later, the developer realizes that the office IP addresses keep changing. Instead of employed the traditional method of re-writing the source code to address changing business rules which were based on information that is no longer valid (such as the IP address being static), the developer can now replace the business rules dynamically with a new set of business rules based on different tokens:

```
"geo_location_check": {
    "property": "source_geo_location",
    "comparison": "not contains",
    "value": "vancouver",
}
```

The embodiments have been described above with reference to flowcharts and block diagrams of methods, apparatuses, systems, and computer program products. In this regard, the flowcharts and block diagrams in FIGS. 1 and 2 illustrate the architecture, functionality, and operation of possible implementations of various embodiments. For instance, each block of the flowcharts and block diagrams may represent a module, segment, or portion of code, which comprises one or more executable instructions for implementing the specified logical function(s). In some alternative embodiments, the functions noted in that block may occur out of the order noted in those figures. For example, two blocks shown in succession may, in some embodiments, be executed substantially concurrently, or the blocks may sometimes be executed in the reverse order, depending upon the functionality involved. Some specific examples of the foregoing have been noted above but those noted examples are not necessarily the only examples. Each block of the block diagrams and flowcharts, and combinations of those blocks, may be implemented by special purpose hardware-based systems that perform the specified functions or acts, or combinations of special purpose hardware and computer instructions.

Each block of the flowcharts and block diagrams and combinations thereof can be implemented by computer program instructions. These computer program instructions may be provided to a processor of a general-purpose computer, special-purpose computer, or other programmable data processing apparatus to produce a machine, such that the instructions, which execute via the processor of the computer or other programmable data-processing apparatus, create means for implementing the functions or acts specified in the blocks of the flowcharts and block diagrams.

These computer program instructions may also be stored in a computer-readable medium that can direct a computer, other programmable data-processing apparatus, or other devices to function in a particular manner, such that the instructions stored in the computer-readable medium produce an article of manufacture including instructions that implement the function or act specified in the blocks of the flowcharts and block diagrams. The computer program instructions may also be loaded onto a computer, other programmable data-processing apparatus, or other devices to cause a series of operational steps to be performed on the computer, other programmable apparatus or other devices to produce a computer-implemented process such that the instructions that execute on the computer or other programmable apparatus provide processes for implementing the functions or acts specified in the blocks of the flowcharts and block diagrams.

Figure 3:
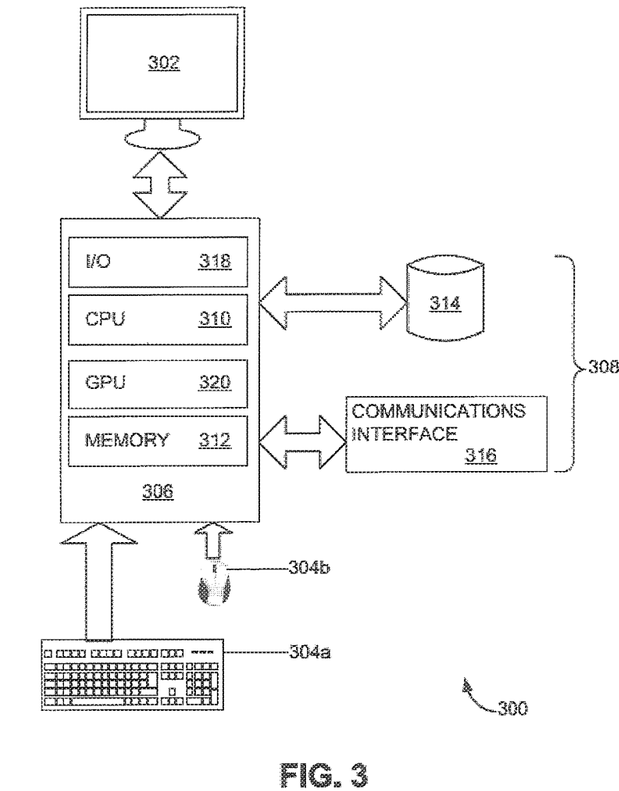
FIG. 3 is a block diagram of a computer system, according to embodiments of the disclosure.

An illustrative computer system 300 in respect of which the methods herein described may be implemented is presented as a block diagram in FIG. 3. The computer system 300 may, for example, be used as DRE 12, application 14, or a combination of the two. Computer system 300 comprises a display 302, input devices in the form of keyboard 304a and pointing device 304b, computer 306, and external devices 308. While pointing device 304b is depicted as a mouse, other types of pointing devices may also be used. In alternative embodiments (not depicted), computer system 300 may not comprise all the components depicted in FIG. 3.

Computer 306 may comprise one or more processors or microprocessors, such as a central processing unit ("CPU") 310, which is depicted. CPU 310 performs arithmetic calculations and control functions to execute software stored in an internal memory 312, such as one or both of random access memory ("RAM") and read only memory ("ROM"), and possibly additional memory 314. Additional memory 314 may comprise, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. Additional memory 314 may be physically internal to computer 306, or external as shown in FIG. 3, or both.

Computer system 300 may also comprise other similar means for allowing computer programs or other instructions to be loaded. Such means can comprise, for example, a communications interface 316 that allows software and data to be transferred between computer system 300 and external systems and networks. Examples of communications interface 316 comprise a modem, a network interface such as an Ethernet card, a wireless communication interface, or a serial or parallel communications port. Software and data transferred via communications interface 316 are in the form of signals which can be electronic, acoustic, electromagnetic, optical, or other signals capable of being received by communications interface 316. Multiple interfaces, of course, can be provided on computer system 300.

Input to and output from computer 306 is administered by the input/output ("I/O") interface 318. I/O interface 318 administers control of display 302, keyboard 304a, external devices 308 and other analogous components of computer system 300. Computer 306 also comprises a graphical processing unit ("GPU") 320. GPU 320 may also be used for computational purposes as an adjunct to, or instead of, CPU 310, for mathematical calculations. However, as mentioned above, in alternative embodiments (not depicted), computer system 300 need not comprise all of these elements.

The various components of computer system 300 are coupled to one another either directly or indirectly by shared coupling to one or more suitable buses.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method of using a Dynamic Rule Engine (DRE) with an application, wherein the method comprises, at runtime of the application:
   determining with the application that a trigger point has been reached;
   identifying with the DRE one or more rules associated with the trigger point, wherein each of the one or more rules defines one or more conditions, and wherein each condition is associated with one or more properties;
   for each of the one or more rules,
      evaluating with the DRE the one or more conditions defined in the rule, wherein evaluating a condition comprises:
         determining a current value of each of the one or more properties associated with the condition; and
         comparing the one or more current values to one or more predetermined values;
      determining with the DRE, based on the comparison, that one or more actions are to be performed; and
      in response to determining that the one or more actions are to be performed, performing with the application the one or more actions; and
   performing one or more of:
      modifying at least one of the rules defined in the DRE by performing one or more of:
         modifying at least one of the conditions defined in the at least one of the rules; and
         modifying at least one of the actions defined in the at least one of the rules; and
      defining in the DRE a new rule associated with at least one trigger point defined in source code of the application, wherein the new rule defines:
         one or more conditions, wherein each condition is associated with one or more properties defined in the source code of the application; and
         one or more actions to be performed, defined in the source code of the application.

2. A system comprising one or more hardware computer processors configured to execute a Dynamic Rule Engine (DRE) module and an application, and further configured to perform a method comprising, at runtime of the application:
   determining with the application that a trigger point has been reached;
   identifying with the DRE one or more rules associated with the trigger point, wherein each of the one or more rules defines one or more conditions, and wherein each condition is associated with one or more properties;
   for each of the one or more rules,
      evaluating with the DRE the one or more conditions defined in the rule, wherein evaluating a condition comprises:
         determining a current value of each of the one or more properties associated with the condition; and comparing the one or more current values to one or more predetermined values;
determining with the DRE, based on the comparison, whether one or more actions are to be performed; and
when the one or more actions are determined to be performed, performing with the application the one or more actions; and
performing one or more of:
modifying at least one of the rules defined in the DRE by performing one or more of:
modifying at least one of the conditions defined in the at least one of the rules; and
modifying at least one of the actions defined in the at least one of the rules; and defining in the DRE a new rule associated with at least one trigger point defined in source code of the application, wherein the new rule defines:
one or more conditions, wherein each condition is associated with one or more properties defined in the source code of the application; and
one or more actions to be performed, defined in the source code of the application.

3. A non-transitory computer-readable medium having stored thereon computer program code configured when executed by one or more processors to cause the one or more processors to perform a method of using a Dynamic Rule Engine (DRE) with an application, wherein the method comprises, at runtime of the application:
determining with the application that a trigger point has been reached;
identifying with the DRE one or more rules associated with the trigger point, wherein each of the one or more rules defines one or more conditions, and wherein each condition is associated with one or more properties;
for each of the one or more rules,
evaluating with the DRE the one or more conditions defined in the rule, wherein evaluating a condition comprises:
determining a current value of each of the one or more properties associated with the condition; and
comparing the one or more current values to one or more predetermined values;
determining with the DRE, based on the comparison, whether one or more actions are to be performed; and
when one or more actions are determined to be performed, performing with the application the one or more actions; and
performing one or more of:
modifying at least one of the rules defined in the DRE by performing one or more of:
modifying at least one of the conditions defined in the at least one of the rules; and
modifying at least one of the actions defined in the at least one of the rules; and defining in the DRE a new rule associated with at least one trigger point defined in source code of the application, wherein the new rule defines:
one or more conditions, wherein each condition is associated with one or more properties defined in the source code of the application; and
one or more actions to be performed, defined in the source code of the application.

4. The non-transitory computer-readable medium of claim 3, wherein the method further comprises:
in response to determining that the trigger point has been reached, sending from the application to the DRE a trigger point identifier associated with the trigger point, wherein identifying with the DRE the one or more rules associated with the trigger point comprises the DRE using the trigger point identifier to identify the one or more rules associated with the trigger point.

5. The non-transitory computer-readable medium of claim 3, wherein the method further comprises the application providing the DRE with a current value of each property in a list of predefined properties.

6. The non-transitory computer-readable medium of claim 3, wherein the method further comprises, prior to runtime of the application, defining in the source code of the application:
one or more trigger points forming a trigger list;
one or more properties forming a property list; and
one or more actions forming an action list.

7. The non-transitory computer-readable medium of claim 6, wherein the method further comprises, prior to runtime of the application, one or more of:
defining in the source code, and adding to the trigger list, at least one further trigger point;
defining in the source code, and adding to the property list, at least one further property; and
defining in the source code, and adding to the action list, at least one further action.

8. The computer-readable medium of claim 6, wherein the method further comprises, at runtime of the application, modifying at least one of the rules defined in the DRE by performing one or more of modifying at least one of the trigger points associated with the at least one of the rules.

9. The non-transitory computer-readable medium of claim 3, wherein each of the one or more actions to be performed is associated with an action identifier, and wherein the method further comprises:
when the one or more actions are determined to be performed, sending from the DRE to the application one or more action identifiers associated with the one or more actions to be performed; and
using with the application the one or more action identifiers to identify, from an action list comprising one or more predefined actions each associated with an action identifier, the one or more actions to be performed.

10. The non-transitory computer-readable medium of claim 3, wherein a property comprises a token defined in the source code of the application.

11. The non-transitory computer-readable medium of claim 3, wherein determining that the trigger point has been reached comprises determining that a portion of the source code associated with the trigger point is being executed.

12. The non-transitory computer-readable medium of claim 3, wherein determining that the trigger point has been reached comprises determining that the application has entered a particular operational state.

13. The non-transitory computer-readable medium of claim 3, wherein performing the one or more actions comprises modifying operation of the application.

14. A non-transitory computer-readable medium having stored thereon computer program code configured when executed by one or more processors to cause the one or more processors to perform a method of using an application, wherein the method comprises, prior to runtime of the application:
defining in source code of the application:
one or more trigger points forming a trigger list;
one or more properties forming a property list; and one or more actions forming an action list,
at runtime of the application,
 determining with the application that a trigger point comprised in the trigger list has been reached;
 in response to determining that the trigger point has been reached, sending a trigger point identifier from the application to a Dynamic Rule Engine (DRE), wherein the trigger point identifier identifies the trigger point that has been reached;
 enabling the DRE to determine, based on the trigger point identifier, one or more current values of one ore more properties comprised in the property list;
 receiving from the DRE, and based on the one or more current values, one or more action identifiers;
 using the one or more action identifiers to identify within the action list one or more actions to be performed; and
 performing the one or more actions to be performed.

15. The non-transitory computer-readable medium of claim 14, wherein enabling the DRE to determine the one or more current values of the one or more properties comprised in the property list comprises:
 determining the one or more current values of the one or more properties comprised in the property list; and
 sending the determined one or more current values to the DRE.

16. The non-transitory computer-readable medium of claim 14, wherein the method further comprises, prior to runtime of the application, one or more of:
 adding at least one further trigger point to the trigger list by defining in the source code the at least one further trigger point;
 adding at least one further property to the property list by defining in the source code the at least one further property; and
 adding at least one further action to the action list by defining in the source code the at least one further action.

17. The non-transitory computer-readable medium of claim 14, wherein a property comprises a token defined in the source code of the application.

18. The non-transitory computer-readable medium of claim 14, wherein determining that the trigger point has been reached comprises determining that a portion of the source code associated with the trigger point is being executed.

19. The non-transitory computer-readable medium of claim 14, wherein determining that the trigger point has been reached comprises determining that the application has entered a particular operational state.

20. The non-transitory computer-readable medium of claim 14, wherein performing the one or more actions comprises modifying operation of the application.

* * * * *